(12) United States Patent
Jouper et al.

(10) Patent No.: US 9,302,781 B2
(45) Date of Patent: Apr. 5, 2016

(54) APPARATUS AND METHOD TO MONITOR THE OCCUPANCY OF SEATING

(71) Applicant: Astronics Advanced Electronic Systems Corp., Kirkland, WA (US)

(72) Inventors: Jeffrey A. Jouper, Newcastle, WA (US); Mark Peabody, Redmond, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 14/189,252

(22) Filed: Feb. 25, 2014

(65) Prior Publication Data

US 2015/0239573 A1 Aug. 27, 2015

(51) Int. Cl.
*G01C 23/00* (2006.01)
*B64D 45/00* (2006.01)
*B64D 11/00* (2006.01)
*B64D 11/06* (2006.01)

(52) U.S. Cl.
CPC ............ *B64D 45/00* (2013.01); *B64D 11/0015* (2013.01); *B64D 11/06* (2013.01)

(58) Field of Classification Search
USPC ............................................................. 701/3
See application file for complete search history.

(56) References Cited

U.S. PATENT DOCUMENTS

| | | | |
|---|---|---|---|
| 6,026,340 A * | 2/2000 | Corrado et al. | 701/47 |
| 8,089,181 B2 | 1/2012 | Jouper et al. | |
| 2003/0158762 A1 * | 8/2003 | Wu | 705/5 |
| 2006/0052933 A1 * | 3/2006 | Ota | 701/200 |
| 2006/0163430 A1 * | 7/2006 | Cordina et al. | 244/118.5 |
| 2007/0040672 A1 * | 2/2007 | Chinigo | 340/539.22 |
| 2008/0068220 A1 * | 3/2008 | Giesa et al. | 340/945 |
| 2008/0258890 A1 * | 10/2008 | Follmer et al. | 340/439 |
| 2010/0308166 A1 | 12/2010 | Bovelli et al. | |
| 2012/0221677 A1 * | 8/2012 | Kim et al. | 709/217 |
| 2012/0242492 A1 * | 9/2012 | Grunfeld | 340/667 |
| 2013/0106995 A1 * | 5/2013 | Jeon et al. | 348/43 |
| 2013/0158778 A1 * | 6/2013 | Tengler et al. | 701/31.5 |
| 2013/0211707 A1 * | 8/2013 | Washlow et al. | 701/411 |

FOREIGN PATENT DOCUMENTS

JP 2005082147 A 3/2005

OTHER PUBLICATIONS

European Patent Office, European Search Report for EP 15154803.9, dated Jul. 20, 2015.

* cited by examiner

*Primary Examiner* — Hussein A. Elchanti
(74) *Attorney, Agent, or Firm* — Wiggin and Dana LLP; Gregory S. Rosenblatt; Jonathan D. Hall

(57) ABSTRACT

Disclosed is a system and method for monitoring the occupancy of seating. Sensors provide measurements to a control circuit that determines an occupancy state for each seat. Information regarding the occupancy of the seats can be presented on a display. In some instances, additional inputs can be used to adjust the occupancy determinations to account for environmental factors. Also, the occupancy states of the seats can be cross-checked with a passenger manifest to facilitate the boarding of a vehicle containing the seating.

18 Claims, 6 Drawing Sheets

APPARATUS AND METHOD TO MONITOR THE OCCUPANCY OF SEATING

FIELD OF THE DISCLOSURE

The subject matter of the present disclosure generally relates to the monitoring of seating, and more particularly relates to the monitoring of the occupancy of passenger seats using electronic sensors.

BACKGROUND OF THE DISCLOSURE

The boarding of passenger vehicles can be a relatively chaotic and slow process, especially when it must be accomplished simultaneously with the stowage of passenger luggage.

In commercial aircraft, passengers must proceed down a narrow aisle or aisles, attempting to locate their assigned seat and also sufficient stowage space for their personal luggage. The flight crew must traverse the same aisles to assist passengers in their boarding and to ensure that all baggage is properly secured. Often, this includes perusing the passenger manifest to ensure that individuals are not in seats that should be empty and confirming that luggage is not placed on empty seats, where it can pose a hazard during take-off. These circumstances can, in turn, lead to flight delays and wasted energy from operating the aircraft on the tarmac.

The subject matter of the present disclosure is directed to overcoming, or at least reducing the effects of, one or more of the problems set forth above.

BRIEF SUMMARY OF THE DISCLOSURE

Disclosed is a system and method to monitor the occupancy of seating. In an embodiment, the occupancy of passenger seats on a commercial aircraft is monitored using ultrasonic sensors. The ultrasonic sensors measure the distance between each sensor and the nearest surface in a direction of interest. A control circuit utilizes these measurements in determining an occupancy state for each passenger seat. Additional inputs may be optionally used to adjust for changes in temperature or altitude. The system and method are adaptable for use with a wide variety of passenger seating configurations, including the retrofitting of previously existing vessels, because the empty state of the seats is used as a baseline against which the utilization of the seats is evaluated.

The disclosed subject matter presents several advantages in the realm of passenger aircraft. Flight attendant workload is reduced by the ability to centrally monitor available seating and quickly identify seats that may have loose luggage or passengers that are supposed to be seated elsewhere. Thus, flight crew members do not need to traverse the aisles of the aircraft as frequently, expediting the completion of the boarding process, alleviating flight delays, reducing costs, and increasing passenger satisfaction.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

Like reference numbers and designations in the various drawings indicate like elements.

DETAILED DESCRIPTION

Disclosed is a system and method for monitoring the utilization of seating.

Figure 1A:
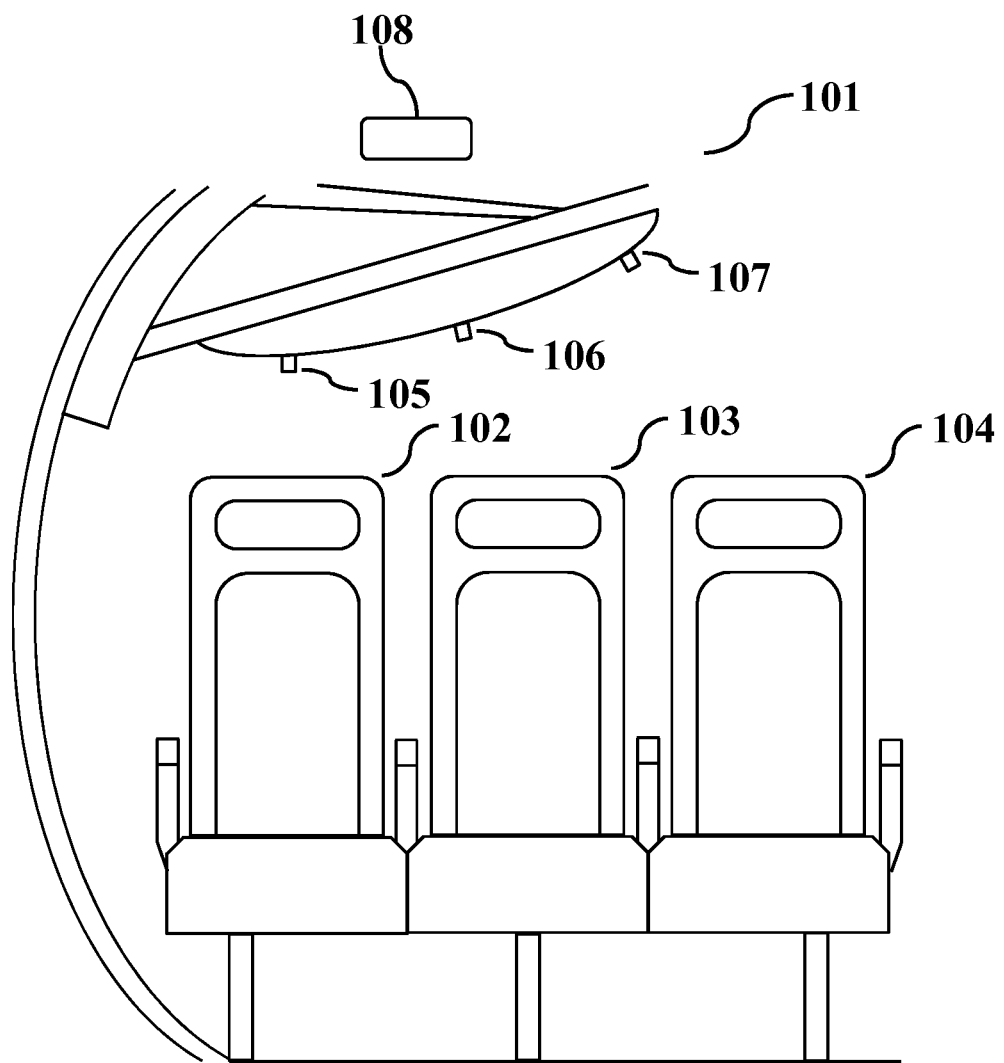
FIG. 1A is an illustration of a front view of an embodiment having a plurality of ultrasonic sensors.

FIG. 1A is a front view illustration of a first embodiment of a system 101. Seats 102, 103, and 104 are passenger seats in a commercial aircraft. Sensors 105, 106, and 107 are each associated with one of seats 102, 103, and 104, respectively. Optionally, sensors 105, 106 and 107 can be built into or attached to an overhead stowage bin. Sensors 105, 106 and 107 are configured to communicate with control circuit 108. Control circuit 108 is configured to determine the occupancy state of seats 102, 103, and 104 using input from their associated sensors 105, 106 and 107.

Control circuit 108 communicates with a display (not pictured) that is configured to present occupancy information regarding the occupancy states of seats 102, 103, and 104. Optionally, the display can be a centralized display, for instance it may be located in the flight attendant area of the passenger aircraft. The display can present a manifest report that is formed by cross-checking a passenger manifest with the occupancy states of seats 102, 103, and 104.

Figure 1B:
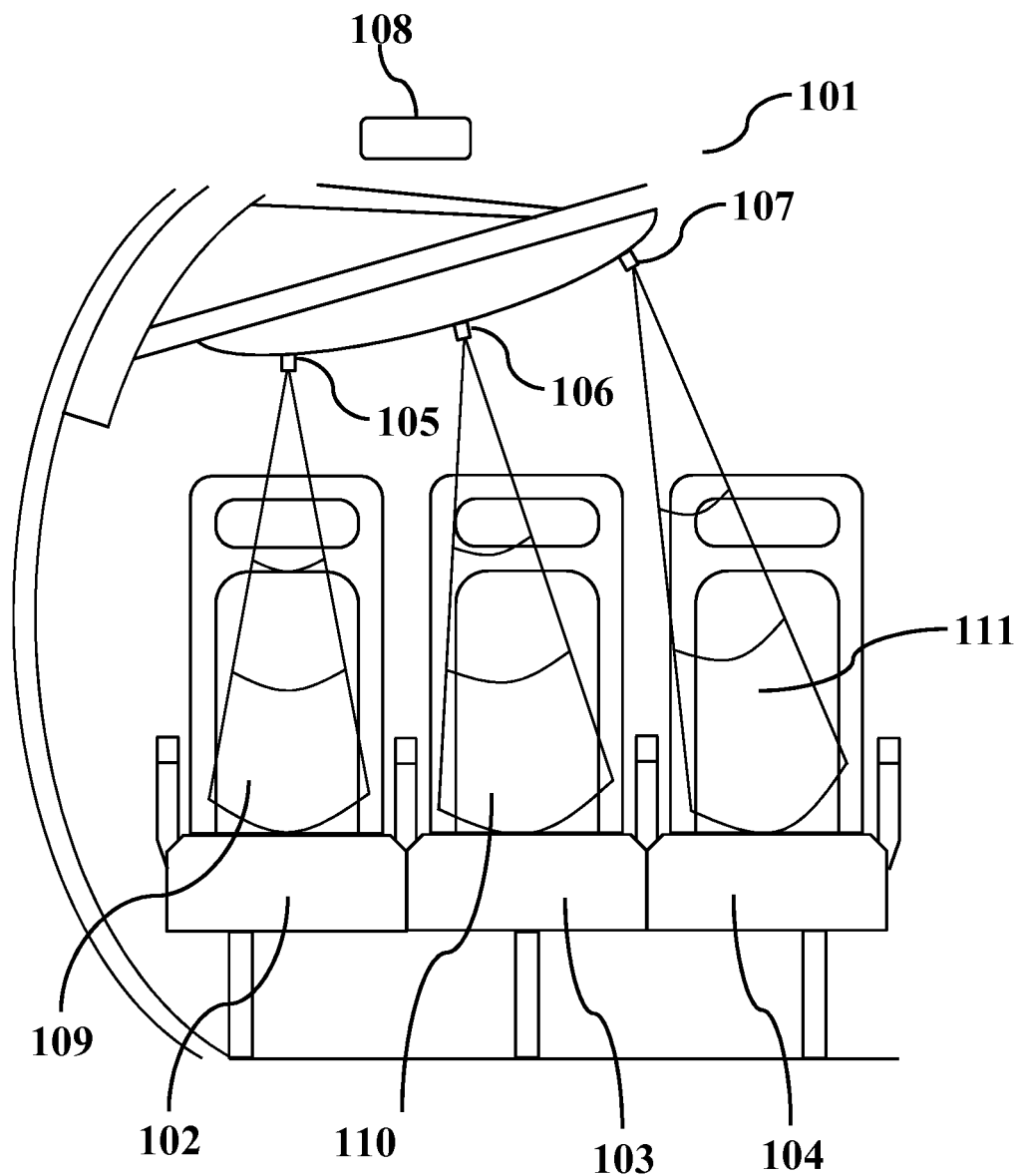
FIG. 1B is an illustration of the embodiment of FIG. 1A with the echolocation signals of the ultrasonic sensors visualized.

As illustrated in FIG. 1B, in the embodiment sensors 105, 106 and 107 are echolocation sensors emitting echolocation signals 109, 110 and 111. Echolocation signals 109, 110 and 111 will strike the nearest surface in a direction of interest and produce a return signal to the sensor that emitted the signal. If a passenger or object is in a particular seat, the echolocation signal from the sensor associated with that seat will produce a return signal in a lesser amount of time than if the seat were empty. By measuring the difference between when the propagation signal is originated and when the return signal is received, and comparing this differential to a pre-existing setting representing an empty condition, the occupancy state of a seat can be determined.

In certain embodiments, control circuit 108 can receive a measured temperature input and/or a measured altitude input. These inputs can allow control circuit 108 to properly adjust the measurements of sensors 105, 106 and 107 based on environmental factors and thus adjust the determination of the occupancy states of seats 102, 103 and 104. For instance, ultrasonic sensors will be affected by changes in propagation time associated with changing temperature and altitude.

The disposition of seats may be classified into various occupancy states. A simple combination could consist of "empty" and "occupied." Other combinations are possible, some depending on the sensors' accuracy. For example, if the sensor detects that there is a surface three inches closer to the sensor than an empty seat, the seat is unlikely to be occupied by a human but may have luggage improperly placed on it. Thus, a "probable luggage" occupancy state could indicate to a flight attendant, for example, that that seat should be checked so that any baggage can be properly stored.

The display may take many various forms and make use of various technologies. For example the display may utilize a liquid crystal display (LCD) or light emitting diode (LED). Various sizes may also be employed, for instance there may be a small local LCD display next to each of a set of seats and a larger central LED display in a centralized area.

Communication among elements of embodiments may be accomplished by a variety of widely available technologies, including both wired and wireless interfaces such as radio frequencies, Wi-Fi, etc.

Various sensor types are suitable for use with the disclosed and other embodiments, including ultrasonic, infrared, LED, photo, and laser sensors. Generally, any device that can accurately range short distance measurements is suitable for use as a sensor in keeping with the present disclosure. Such sensors may vary widely in number and orientation, and may be employed in combination with one another. For instance, an ultrasonic sensor may be paired with an infrared sensor in order for the system to be better able to distinguish between luggage placed on a seat and a small child. The operation of such sensors is described generally so as not to obscure the subject matter to which the present disclosure is directed, as such sensors are well known and documented.

Figure 2:
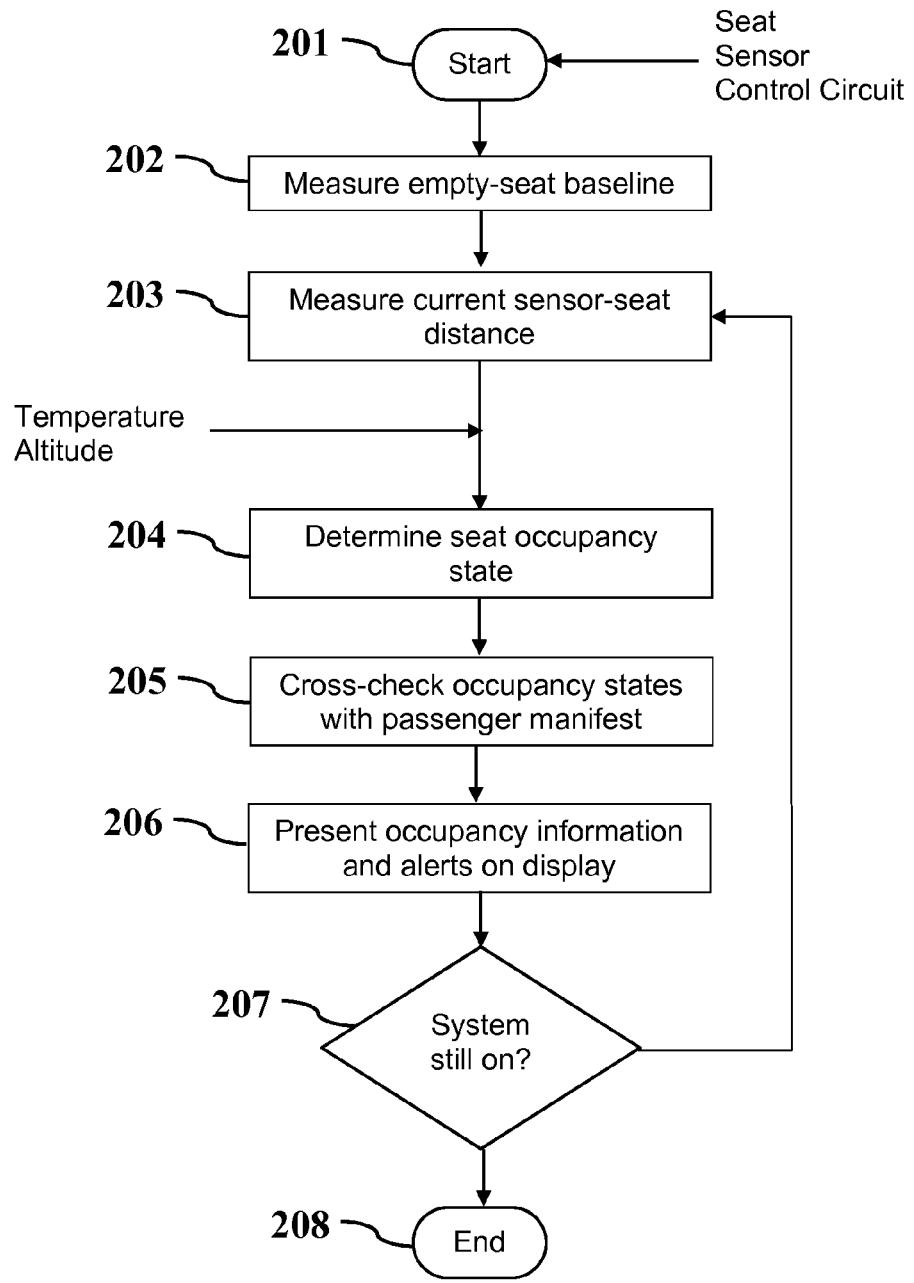
FIG. 2 is flowchart diagram of an embodiment.

FIG. 2 is a flowchart diagram of a process embodiment. In initial step 201, a seat with an associated sensor, and a control circuit in communication with the sensor are provided. In step 202, the sensor is used to measure the distance between the sensor and the seat it is associated with, when the seat is empty. This measurement is used as a baseline against which future determinations as to the occupancy state of the seat can be made. In step 203, the current distance between the sensor and the nearest surface in the sensor's direction of interest is measured. In step 204, the occupancy state of the seat is determined. In an embodiment, the measurement of the distance to the nearest object from step 203 is compared to the baseline measurement of the distance to the seat from step 202. If the measured distance to the nearest object is less than the baseline measurement, the occupancy state of the seat is not empty. Depending on the measured distance, the occupancy state could indicate that either a passenger or luggage is likely to be present in the seat. The control circuit receives a temperature and altitude input. These inputs can be utilized during the determination of the occupancy state to adjust measurements from the sensors to account for environmental conditions. For example, the signal propagation speed of the sensors may vary due to altitude or temperature. In step 205, the occupancy state of the seat is cross-checked against a passenger manifest. In step 206, occupancy information regarding the occupancy state of the seat is presented on the display. If any discrepancies between the passenger manifest and the occupancy state of the seat were identified in step 205, an alert regarding such a discrepancy is presented in step 206. For instance, if a seat is supposed to be empty according to the passenger manifest but is, in fact, occupied, a flight crew member can be alerted that the seat should be checked for loose luggage or an errantly seated passenger.

In step 207, if the system is still in operation the process returns to step 203, so that the occupancy state of the seat is continually monitored. If the system is not still in operation, the process is concluded in step 208.

By measuring the distance between the sensor and the seat when the seat is known to be empty, a baseline can be easily established. Thus, the system can be easily configured to operate with any number of seat types and configurations.

Figure 3:
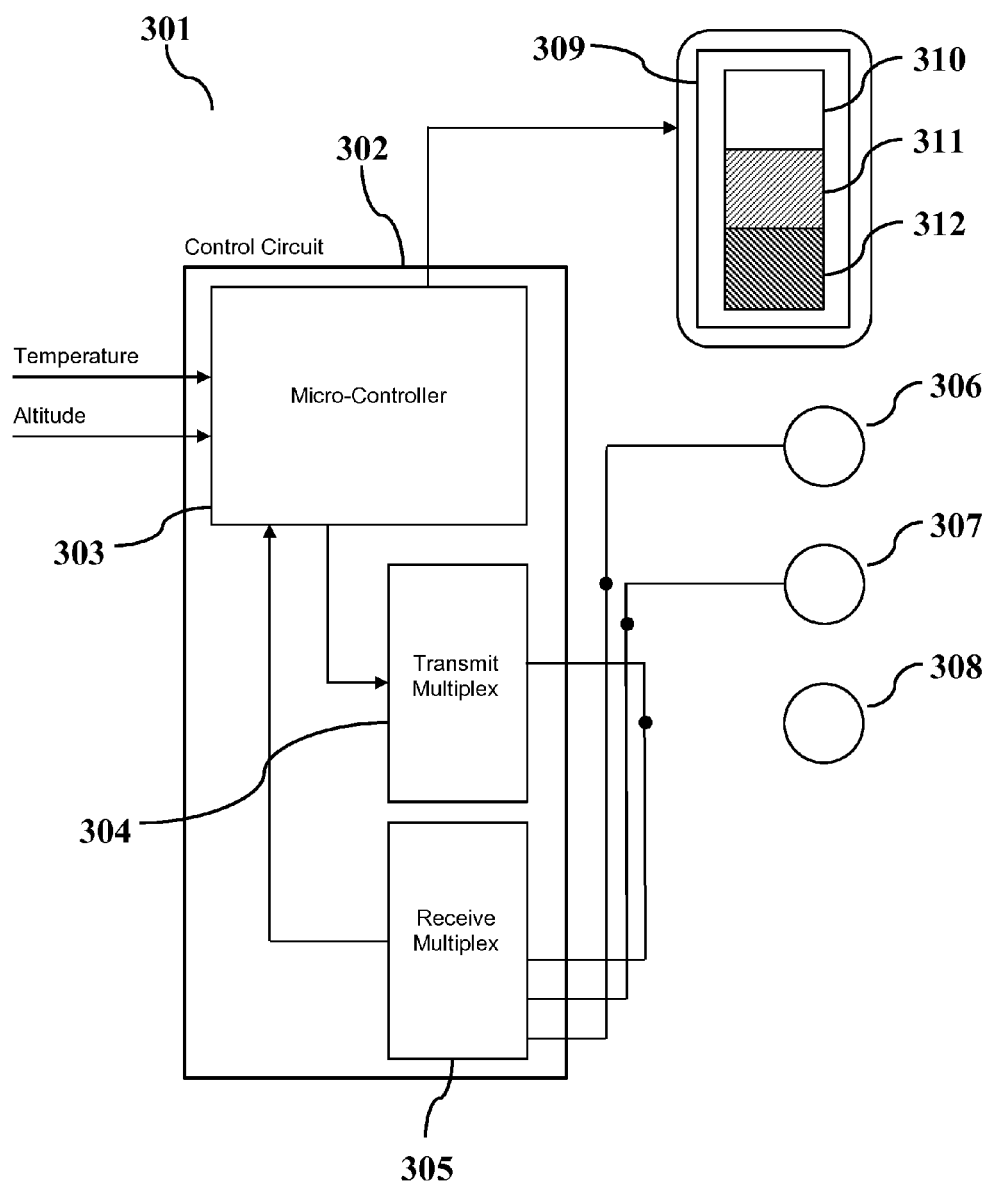
FIG. 3 is a schematic drawing of the electronic components of an embodiment.

FIG. 3 is an electrical schematic of an embodiment 301. Control circuit 302 contains micro-controller 303, transmit multiplex 304 and receive multiplex 305. Transmit transducers 306, 307, 308 are each associated with a respective seat (not pictured), and are connected to transmit multiplex 304 and receive multiplex 305. Microcontroller 303 is configured to output to display 309. In the embodiment, display 309 has first seat indicator 310, second seat indicator 311 and third seat indicator 312, that correspond to the seats associated with transducers 306, 307 and 308. Microcontroller 303 can output information to display 309, particularly information regarding the occupancy state of the seats. In the embodiment, microcontroller 303 also receives a temperature and altitude input.

Microcontroller 303 provides sensor selection, transmit and receive functions as well as occupancy state determinations. In operation, microcontroller 303 selects a first transmit transducer, in this case transmit transducer 306, through transmit multiplexer 304 and sends a pulse train to transducer 306 using a transmit signal. This pulse train creates a high frequency signal. Preferably, such a signal is above the audible range, such as approximately 40 KHz. In the embodiment, at sea level and nominal temperature, the propagation time of the signal is approximately 1100 ft/second for a 40 KHz signal. The pulse travels through the air and is reflected either by the seat or by an object or person in the seat. The reflected pulse train is received by transducer 306 and a receive signal is communicated to microcontroller 303 through the receiver multiplexer 305. With the temperature and altitude inputs, micro-controller 303 can adjust its determination of seat occupancy states to account for differences in sensor operation caused by changes in altitude or temperature.

In the embodiment, display indicator 310 indicates that the occupancy state of the seat associated with transducer 306 is unoccupied, or empty. Conversely, display indicator 311 indicates that the occupancy state of the seat associated with transducer 307 is occupied. Display indicator 312 indicates that the seat associated with transducer 308 is occupied but should not be occupied according to a cross-check with a passenger manifest.

Figure 4:
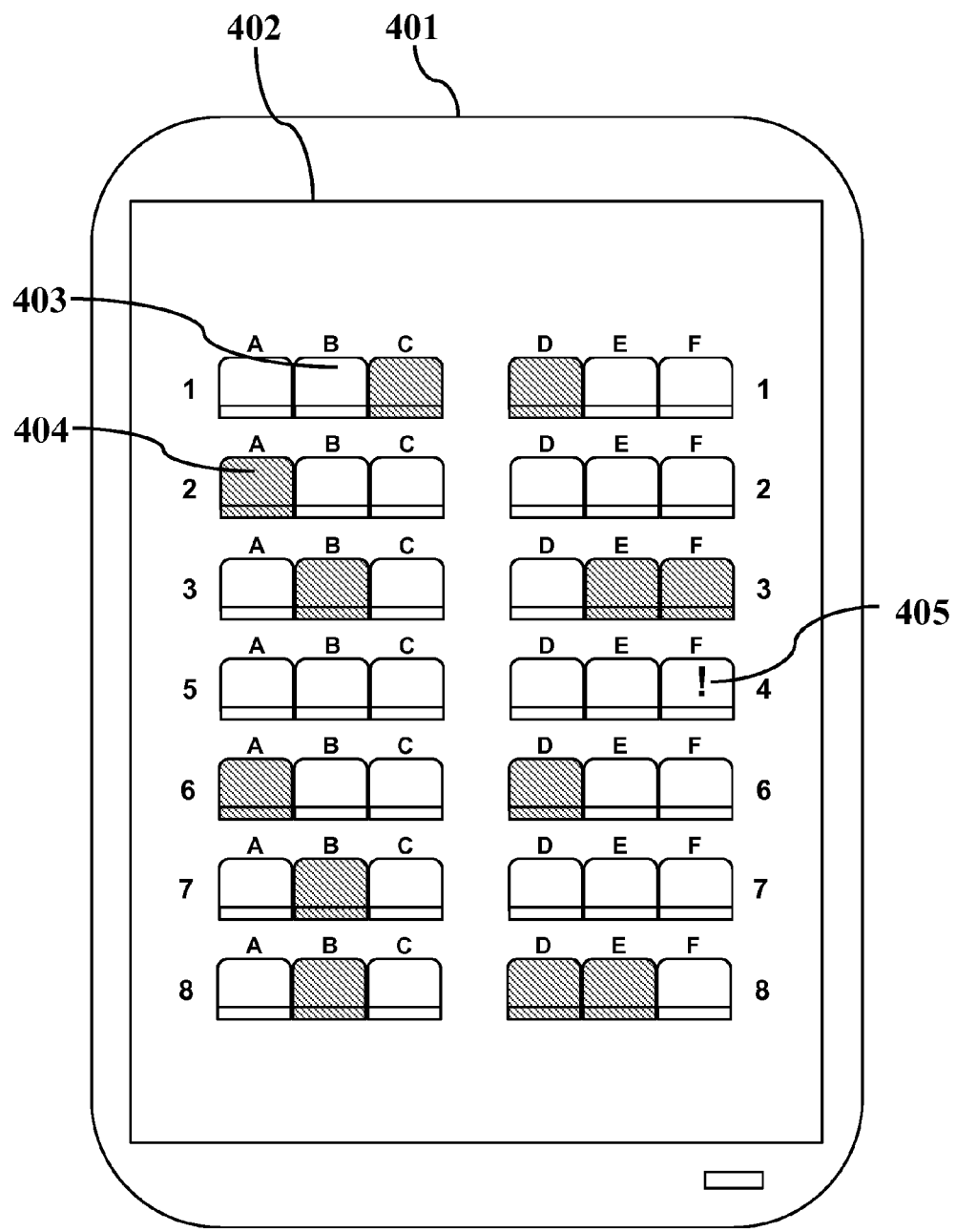
FIG. 4 is illustration of the display of an embodiment.

FIG. 4 illustrates a display of an embodiment that is centrally located in the flight attendant area of a passenger aircraft. Electronic device 401 has display 402. Presented on display 402 is information regarding the occupancy states of a set of passenger seats. In the embodiment, empty seats 403 are displayed without shading and occupied seats 404 are displayed with shading. Alert 405 indicates to the flight crew that the cross check of the passenger manifest with the occupancy states of the passenger seats indicated that a passenger or luggage was present in a seat that should be empty. The flight crew can then go to that seat to either move the errant passenger or stow any stray luggage that may be occupying the seat. Optionally, seats that the manifest shows should be occupied that are empty may be marked for flight attendants so that additional stand-by passengers may be seated. Various methods, symbols, colors, text and numerals may optionally be used to relay the occupancy states of the passenger seats.

Figure 5:
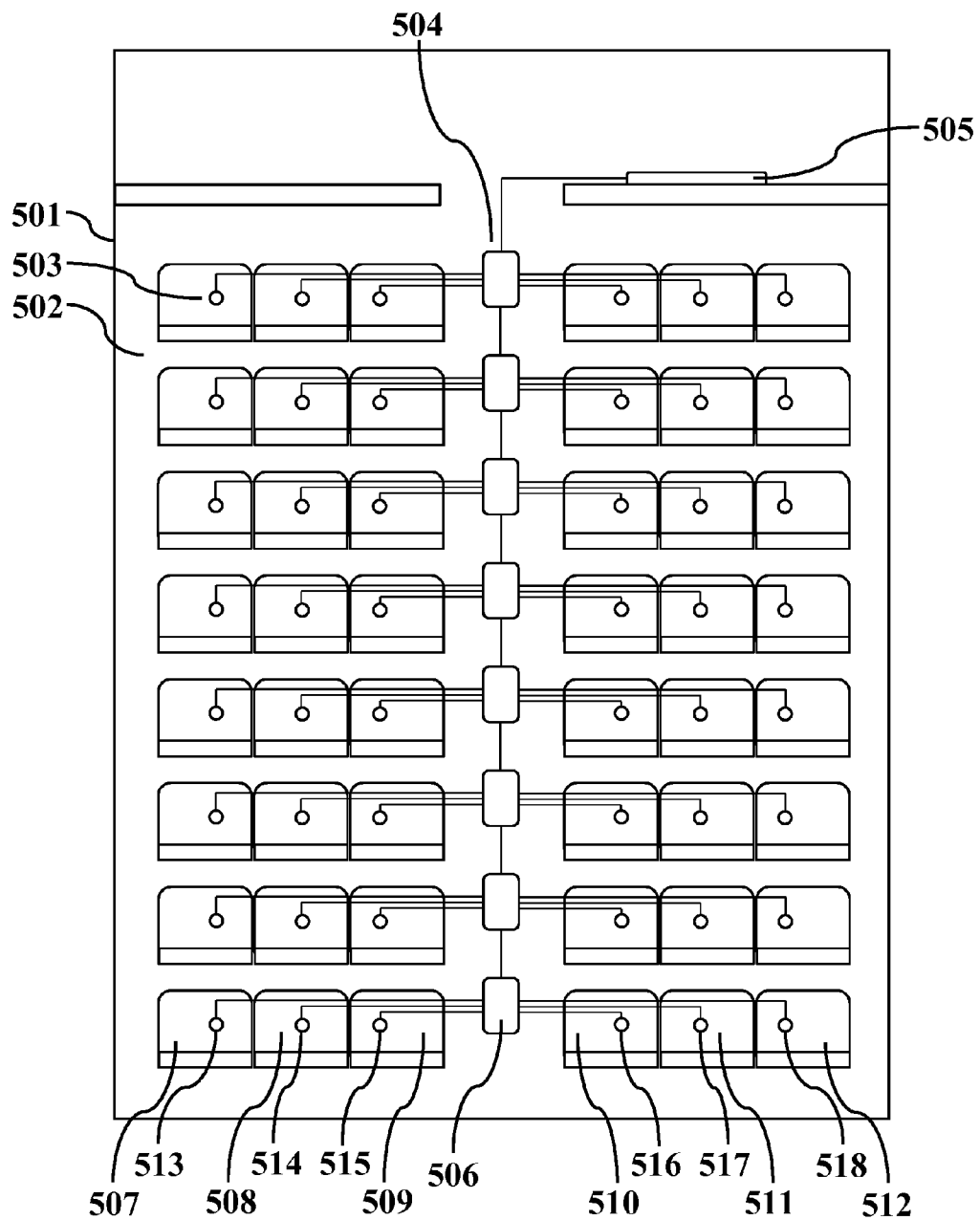
FIG. 5 is an overhead schematic drawing of an embodiment monitoring passenger seats in a commercial aircraft.

FIG. 5 is a schematic top view of an embodiment. Within enclosure 501, in this case the passenger area of a commercial aircraft, there is a plurality of passenger seats 502. There are sensors 503, with at least one sensor associated with each passenger seat. Each sensor measures the distance between it and the nearest surface in a direction of interest. Control circuits 504 together receive a distance measurement from each sensor and determine an occupancy state for each of passenger seats 502. Display 505 receives from control circuits 504 the occupancy states of each of the passenger seats and displays occupancy information to the user. Display 505 is centralized in a flight attendant area, so that the flight crew can monitor the boarding process without needing to traverse the aisle.

In the embodiment, control circuit 506 has associated with it particular passenger seats 507, 508, 509, 510, 511 and 512, each associated with a respective sensor, in this case 511, 512, 513, 514, 515 and 516. It should be noted that any number of sensors could be paired with any appropriate number of control circuits, and control circuits may communicate with one another or directly with a display.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. A seating monitoring system, comprising:
   a plurality of sensors, each associated with one of a plurality of passenger seats on a commercial aircraft;
   the sensors configured to communicate with at least one control circuit; and wherein the control circuit is configured to determine the occupancy states of the seats using input from the associated sensors and communicate the occupancy states to a display, wherein the input is adjusted based on a measured altitude input; and
   wherein the display is configured to present an amount of occupancy information.

2. The system of claim 1, wherein the display is a centralized display.

3. The system of claim 1, wherein the sensors are integrated with an overhead stowage construction.

4. The system of claim 3, wherein the presented occupancy information includes a manifest report formed from cross-checking a passenger manifest with the occupancy state of each of the passenger seats.

5. The system of claim 1, wherein the control circuits are further configured to adjust the determination of the occupancy states according to a measured temperature input.

6. The system of claim 1 wherein a type of the sensors is selected from the group consisting of ultrasonic, infrared, photo, LED, and laser.

7. A system for monitoring the occupancy of a passenger enclosure, comprising:
   a plurality of sensors, each associated with one of a plurality of passenger seats; wherein each sensor is a laser sensor;
   wherein each sensor configured to measure a distance between the particular sensor and the nearest surface in a direction of interest;
   at least one control circuit, together configured to receive from each sensor a distance measurement and determine an occupancy state for each of the passenger seats, wherein the distance measurement is adjusted based on a measured altitude input; and
   a display, configured to receive from the control circuits the occupancy state of each of the passenger seats and present an amount of occupancy information.

8. The system of claim 7, wherein the passenger seats are passenger seats on a commercial aircraft.

9. The system of claim 8, wherein the display is a centralized display.

10. The system of claim 8, wherein the presented occupancy information includes a manifest report formed from cross-checking a passenger manifest with the occupancy state of each of the passenger seats.

11. The system of claim 10, wherein the manifest report includes an amount of alert information regarding any passenger seats that are supposed to be empty according to the passenger manifest but have an occupancy state other than empty.

12. The system of claim 7, wherein the control circuits are further configured to adjust the determination of the occupancy state of each of the passenger seats according to at least one of a measured temperature input and a measured altitude input.

13. A method of monitoring the occupancy of at least one seat, comprising the steps of:
   providing at least one seat, each having at least one associated sensor;
   providing at least one control circuit;
   measuring using the sensors the distance between each sensor and each associated seat when the seats are empty;
   measuring using the sensors the present distance between each sensor and each associated seat;
   determining using the control circuits an occupancy state for each seat based in the measured present distance, wherein the measured present distance is adjusted according to a measured altitude input, adjusting for according to a measured altitude input; and
   presenting on a display an amount of occupancy information regarding the occupancy states of the seats.

14. The method of claim 13, wherein the display is a centralized display.

15. The method of claim 13, wherein the at least one seat is a plurality of passenger seats on a commercial aircraft.

16. The method of claim 15, further comprising the steps of:
   forming a manifest report by cross-checking a passenger manifest with the occupancy state of each of the passenger seats; and
   presenting the manifest report on the display.

17. The method of claim 13, wherein during the step of determining the occupancy state for each seat, adjusting the determination according to a measured temperature input.

18. The system of claim 13 wherein a type of the sensors is selected from the group consisting of ultrasonic, infrared, photo, LED, and laser.

* * * * *